(12) United States Patent
Matsuura

(10) Patent No.: US 12,177,605 B2
(45) Date of Patent: Dec. 24, 2024

(54) REMOTE CONFERENCE SYSTEM, OUTPUT IMAGE CONTROL METHOD, AND OUTPUT IMAGE CONTROL PROGRAM

(71) Applicant: KONICA MINOLTA, INC., Tokyo (JP)

(72) Inventor: Tsumoru Matsuura, Toyohashi (JP)

(73) Assignee: KONICA MINOLTA, INC., Tokyo (JP)

(*) Notice: Subject to any disclaimer, the term of this patent is extended or adjusted under 35 U.S.C. 154(b) by 180 days.

(21) Appl. No.: 17/832,177

(22) Filed: Jun. 3, 2022

(65) Prior Publication Data
US 2023/0007060 A1   Jan. 5, 2023

(30) Foreign Application Priority Data

Jul. 5, 2021   (JP) .................................. 2021-111805

(51) Int. Cl.
| | |
|---|---|
| *H04N 7/15* | (2006.01) |
| *H04L 65/1089* | (2022.01) |
| *H04L 65/403* | (2022.01) |
| *H04N 1/00* | (2006.01) |
| *H04N 7/14* | (2006.01) |

(52) U.S. Cl.
CPC ........... *H04N 7/15* (2013.01); *H04L 65/1089* (2013.01); *H04L 65/403* (2013.01); *H04N 1/00209* (2013.01); *H04N 7/14* (2013.01); *H04N 1/00244* (2013.01); *H04N 2201/0094* (2013.01)

(58) Field of Classification Search
CPC ........... H04N 1/00209; H04N 1/00244; H04N 2201/0094; H04N 7/147; H04N 7/15; H04N 1/4433; H04N 1/0028; H04N 1/00408; H04N 1/00464; H04N 1/00938
See application file for complete search history.

(56) References Cited

U.S. PATENT DOCUMENTS

| | | | | |
|---|---|---|---|---|
| 5,996,003 | A * | 11/1999 | Namikata | H04N 7/147 348/E7.083 |
| 6,025,871 | A * | 2/2000 | Kantor | G06F 3/147 348/E7.083 |
| 10,237,324 | B1 * | 3/2019 | DeLuca | H04L 65/403 |
| 11,079,995 | B1 * | 8/2021 | Hulbert | G06F 3/0485 |
| 2008/0239994 | A1 * | 10/2008 | Xiong | H04M 3/567 370/260 |

(Continued)

FOREIGN PATENT DOCUMENTS

JP   H09101767 A   4/1997

*Primary Examiner* — Quoc D Tran
(74) *Attorney, Agent, or Firm* — Buchanan Ingersoll & Rooney PC

(57) ABSTRACT

There is provided a remote conference system that remotely implements a conference using a plurality of operating devices respectively operated by a plurality of participants, and the remote conference system includes a hardware processor that: outputs a first image shared by the plurality of participants to cause the first image to be displayed on each of the plurality of operating devices; determines an output destination on a basis of a state of a requesting device operated by a requester among the plurality of operating devices; and outputs a second image different from the first image to cause the second image to be output from the output destination determined by the hardware processor in a state in which the first image is displayed on the requesting device.

16 Claims, 12 Drawing Sheets

(56) References Cited

U.S. PATENT DOCUMENTS

| | | | |
|---|---|---|---|
| 2010/0241653 A1* | 9/2010 | Sakiyama | H04N 1/00408 |
| | | | 707/769 |
| 2011/0123972 A1* | 5/2011 | Friedman | H04N 7/18 |
| | | | 434/308 |
| 2021/0126915 A1* | 4/2021 | Lakoumentas | H04L 65/4015 |
| 2022/0103603 A1* | 3/2022 | Vendrow | G06F 3/04842 |
| 2022/0303314 A1* | 9/2022 | Wu | H04L 65/1016 |

* cited by examiner

FIG. 5

| # | REFERENCE SOURCE PAGE | REFERENCE DESTINATION PAGE |
|---|---|---|
| 1 | 5 | 10 |
| 2 | 6 | 7 |
| 3 | 23 | 3 |
| 4 | 31 | 29 |

FIG. 6

| # | REFERENCE SOURCE PAGE | REFERENCE CHART NUMBER | CHART NUMBER PAGE |
|---|---|---|---|
| 1 | 2 | FIG. 3 | 5 |
| 2 | 4 | TABLE 1 | 2 |
| 3 | 10 | FIG. 25 | 15 |
| 4 | 21 | GRAPH 8 | 23 |

FIG. 7

| # | SPEAKER | SPEECH PAGE |
|---|---------|-------------|
| 1 | SATO    | 1           |
| 2 | SUZUKI  | 2           |
| 3 | TANAKA  | 3           |
| 4 | YAMADA  | 4           |

FIG. 8

| # | PRESENTATION PAGE | DISPLAY START TIME | DISPLAY END TIME | DISPLAY TIME (SECONDS) |
|---|-------------------|--------------------|------------------|------------------------|
| 1 | 1 | 10:00, 00 | 10:00, 20 | 20 |
| 2 | 2 | 10:00, 20 | 10:00, 25 | 5  |
| 3 | 3 | 10:00, 25 | 10:01, 25 | 60 |
| 4 | 4 | 10:01, 25 | 10:02, 25 | 90 |

100-4 TO 100-N

REMOTE CONFERENCE SYSTEM, OUTPUT IMAGE CONTROL METHOD, AND OUTPUT IMAGE CONTROL PROGRAM

The entire disclosure of Japanese patent Application No. 2021-111805, filed on Jul. 5, 2021, is incorporated herein by reference in its entirety.

BACKGROUND

Technological Field

The present invention relates to a remote conference system, an output image control method, and an output image control program, and more particularly, to a remote conference system that remotely implements a conference using a plurality of operating devices respectively operated by a plurality of participants, an output image control method executed in the remote conference system, and an output image control program that causes a computer to execute the output image control method.

Description of the Related Art

In recent years, a remote conference system has become widespread in which a plurality of participants located at distant places hold a conference via computers. In the remote conference system, in a case where one presenter among the participants of the conference makes a presentation, an image of a page used by the presenter to make the presentation is displayed on computers operated by all the participants. In this case, the participants may desire to refer to an image different from a page used by the presenter for presentation in addition to the page.

In JP 9-101767 A, a terminal device is described that is connected via a network, the terminal device switching between a state in which a page selected by a participant from conference material is displayed and a synchronous state in which a page is displayed that is the same page as the conference material being viewed by another participant selected by the participant, for example, a presenter.

However, according to the technique described in JP 9-101767 A, a page being viewed by the presenter and a page selected by the participant cannot be simultaneously displayed. In addition, to select a page to be displayed, it is necessary for the participant to perform selection from among thumbnails of a plurality of pages, and the selection is difficult. For this reason, there is a problem that it is difficult to display an appropriate page in accordance with progress of the conference.

SUMMARY

One object of the present invention is to provide a remote conference system that improves convenience of participants of a conference.

Another object of the present invention is to provide an output image control method that improves convenience of participants of a conference.

Still another object of the present invention is to provide an output image control program that improves convenience of participants of a conference.

To achieve at least one of the abovementioned objects, according to an aspect of the present invention, there is provided a remote conference system that remotely implements a conference using a plurality of operating devices respectively operated by a plurality of participants, and the remote conference system reflecting one aspect of the present invention comprises a hardware processor that: outputs a first image shared by the plurality of participants to cause the first image to be displayed on each of the plurality of operating devices; determines an output destination on a basis of a state of a requesting device operated by a requester among the plurality of operating devices; and outputs a second image different from the first image to cause the second image to be output from the output destination determined by the hardware processor in a state in which the first image is displayed on the requesting device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating an example of a first association table;

FIG. 6 is a diagram illustrating an example of a second association table;

FIG. 7 is a diagram illustrating an example of a speaker table;

FIG. 8 is a diagram illustrating an example of a display time table;

DETAILED DESCRIPTION OF EMBODIMENTS

Figure 1:
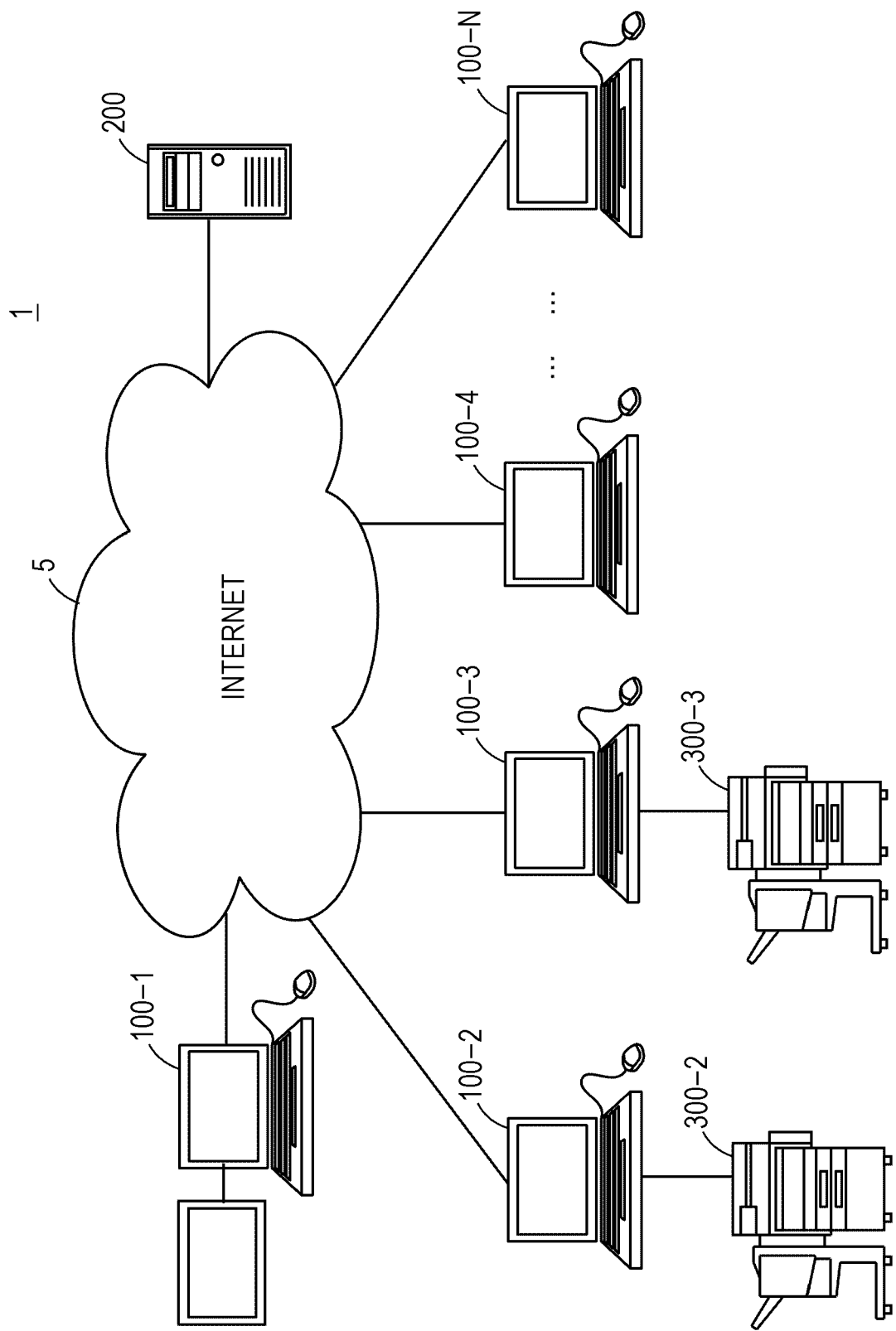
FIG. 1 is a diagram illustrating an example of a system configuration of a remote conference system in one of embodiments of the present invention.

Hereinafter, one or more embodiments of the present invention will be described with reference to the drawings. However, the scope of the invention is not limited to the disclosed embodiments. In the following description, the same components are denoted by the same reference numerals. The names and functions thereof are also the same. Thus, detailed description thereof will not be repeated.

FIG. 1 is a diagram illustrating an example of a system configuration of a remote conference system in one of embodiments of the present invention. Referring to FIG. 1, a remote conference system 1 includes a server 200 and personal computers (hereinafter referred to as "PCs") 100-1, 100-2, 100-3, and 100-4 to 100-N. Here, N is a positive integer, and is greater than or equal to five. The server 200 and the PCs 100-1 to 100-N are connected to an Internet 5 and can communicate with each other.

Each of the PCs 100-1 to 100-N includes a camera, a microphone that collects voice, and a speaker that outputs sound. Each of the PCs 100-1 to 100-N is a general computer, and has the same main hardware configuration and functions, and thus the PCs 100-1 to 100-N are collectively referred to as a PC 100, and the PC 100 will be described unless otherwise specified.

Note that, instead of the PCs 100-1 to 100-N, an information communication device such as a personal digital assistance (PDA) or a smartphone may be used as long as the device includes a camera, a microphone, a speaker, and a communication function.

The PC 100-1 includes two display devices. The display device is a liquid crystal display device (LCD) or an organic electro-luminescence (EL) panel. The PC 100-2 and the PC 100-3 are connected to multi function peripherals (MFPs) 300-2 and 300-3, respectively. The MFPs 300-2 and 300-3 each are an example of an image forming apparatus. Note that, instead of the MFPs 300-2 and 300-3, an image forming apparatus such as a laser printer, an inkjet printer, or a facsimile machine may be used.

A network to which the server 200 and the PCs 100-1 to 100-N are connected is not limited to the Internet 5, and may be another network as long as the server 200 and the PCs 100-1 to 100-N can communicate with each other. As the network, for example, a local area network (LAN) or a wide area network (WAN) is used.

In the remote conference system 1 in the present embodiment, a participant participates in a conference by operating any of the PCs 100-1 to 100-N. As an example, a description will be given of a case where a presenter is included among a plurality of participants in the remote conference system 1 in the present embodiment. The presenter explains to other participants by using conference material including a plurality of pages. For that, a page selected by the presenter among presentation materials is displayed on the PCs respectively operated by all other participants, and voice of the presenter is output from the PCs respectively operated by all the other participants. Here, as an example, a description will be given of a case where a participant who operates the PC 100-N is the presenter.

A program for participating in the conference is installed in each of the PCs 100-1 to 100-N, and each of the PCs 100-1 to 100-N communicates with the server 200, whereby the conference is held. The program installed in each of the PCs 100-1 to 100-N may be a dedicated program for communicating with the server 200, and in addition, in a case where the server 200 provides a web service, may be a general browser program.

The server 200 executes a remote conference program, whereby a remote conference system is implemented. The server 200 communicates with the PCs 100-1 to 100-N, and transmits data received from each of the PCs 100-1 to 100-N to each of the other PCs 100-1 to 100-N.

The data transmitted and received between each of the PCs 100-1 to 100-N and the server 200 includes voice information indicating voice, video information indicating video, and application data. The data transmitted and received between each of the PCs 100-1 to 100-N and the server 200 may be compressed data or uncompressed data.

The server 200 manages data to be transmitted to each of the PCs 100-1 to 100-N. For example, the server 200 transmits voice data received from each of the PCs 100-1 to 100-N to all of the PCs 100-1 to 100-N. In addition, regarding the video information, the server 200 aggregates video data received from each of the PCs 100-1 to 100-N, and transmits the aggregated video data to each of the PCs 100-1 to 100-N.

The server 200 determines and transmits video and application data to be transmitted in response to a request from each of the PCs 100-1 to 100-N. Thus, images displayed on the respective PCs 100-1 to 100-N may be the same or different. Note that, each of the PCs 100-1 to 100-N may process and display the video information received from the server 200. In this case, processing to process the video information by the server 200 becomes unnecessary, and thus a load on the server 200 is reduced.

Note that, as an example, a description will be given of a case where the remote conference system 1 in the present embodiment includes the server 200; however, the remote conference system 1 does not necessarily have to include the server 200. In this case, each of the PCs 100-1 to 100-N has functions of the server 200 described below.

Figure 2:
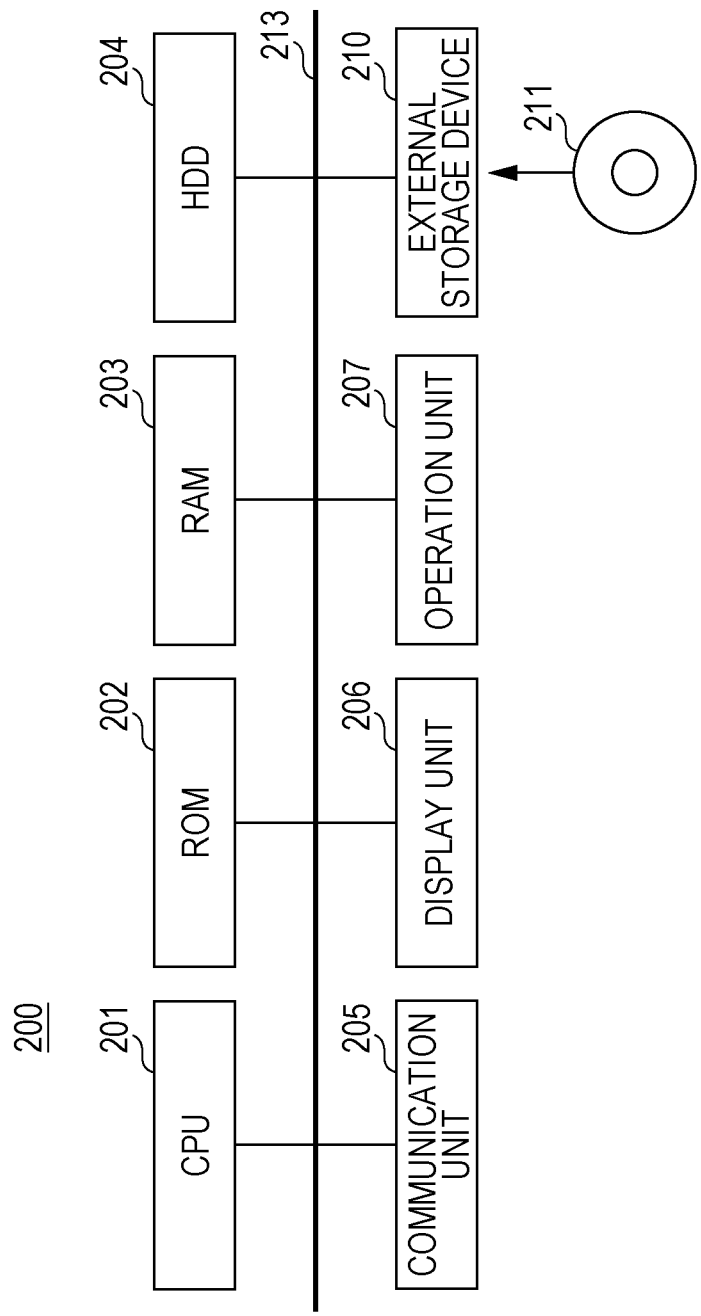
FIG. 2 is a block diagram illustrating an example of a hardware configuration of a server.

FIG. 2 is a block diagram illustrating an example of a hardware configuration of a server. Referring to FIG. 2, the server 200 is a computer that performs arithmetic processing, and includes a central processing unit (CPU) 201 for controlling the entire server 200, a read only memory (ROM) 202 that stores a program to be executed by the CPU 201, a random access memory (RAM) 203 that is used as a work area of the CPU 201, an HDD 204 that stores data in a nonvolatile manner, a communication unit 205 that connects the CPU 201 to the Internet 5, a display unit 206 that displays an image, an operation unit 207 that accepts input of operation, and an external storage device 210, each of which is connected to a bus 213.

The communication unit 205 is an interface for connecting the server 200 to the Internet 5. The CPU 201 can therefore communicate with the PCs 100-1 to 100-N connected to the Internet 5 via the communication unit 205.

A compact disk read only memory (CD-ROM) 211 is attached to the external storage device 210. The CPU 201 controls the external storage device 210 to read data stored in the CD-ROM 211.

In the present embodiment, the CPU 201 executes a program stored in the ROM 202 or the HDD 204. In addition, the CPU 201 may control the external storage device 210 to read a program to be executed by the CPU 201 from the CD-ROM 211, and store the read program in the RAM 203 to execute the read program.

Further, the CPU 201 downloads a program from a computer connected to the Internet 5 and stores the program in the HDD 204. In a case where a computer connected to the Internet 5 writes a program to the HDD 204, the program is stored in the HDD 204. The CPU 201 may load the program stored in the HDD 204 into the RAM 203 and execute the program.

Note that, a recording medium that stores the program to be executed by the CPU 201 is not limited to the CD-ROM 211, but may be a medium such as a flexible disk, a cassette tape, an optical disk (Magnetic Optical Disc (MO)/Mini Disc (MD)/Digital Versatile Disc (DVD)), an IC card, an optical card, or semiconductor memories such as a mask ROM and an Erasable Programmable ROM (EPROM). The program referred to here includes not only a program that can be directly executed by the CPU 201, but also a source program, a compressed program, an encrypted program, and the like.

Figure 3:
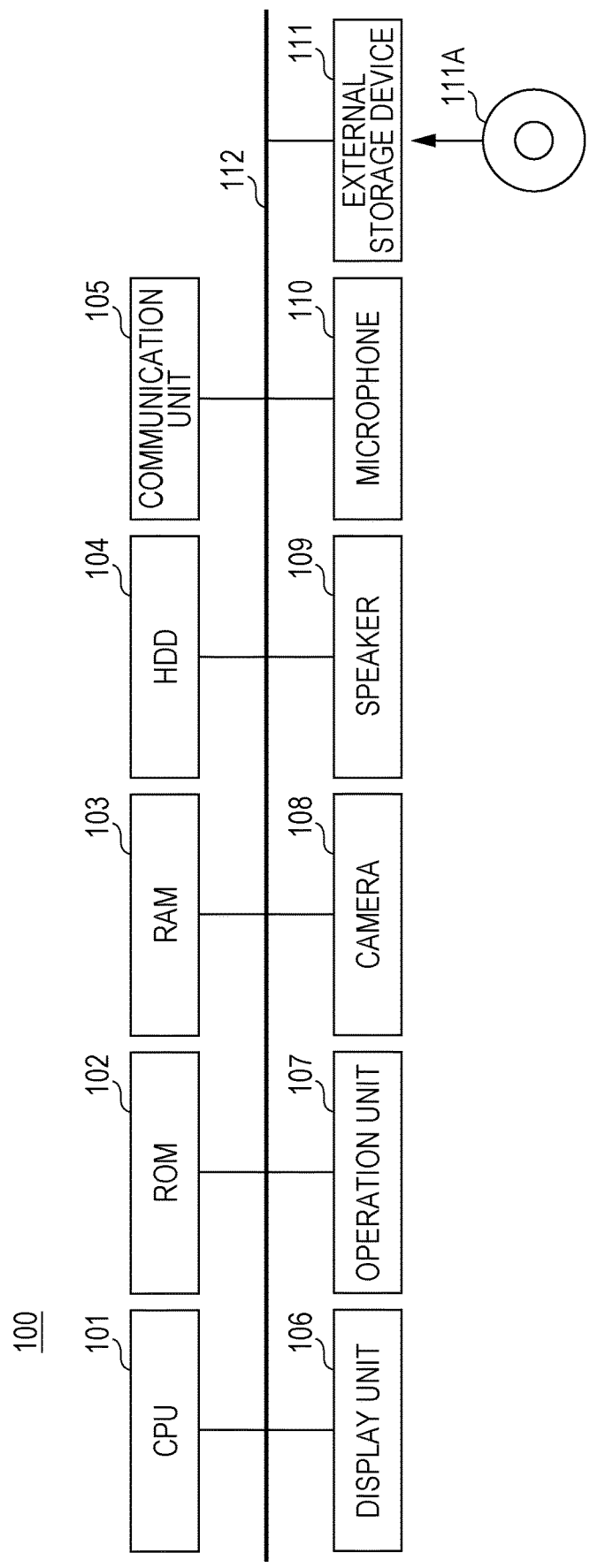
FIG. 3 is a block diagram illustrating a hardware configuration of a PC.

FIG. 3 is a block diagram illustrating a hardware configuration of a PC. Referring to FIG. 3, the PC 100 is a computer that performs arithmetic processing, and includes a CPU 101 for controlling the entire PC 100, a ROM 102 that stores a program to be executed by the CPU 101, a RAM 103 that is used as a work area of the CPU 101, an HDD 104 that stores data in a nonvolatile manner, a communication unit 105 that connects the CPU 101 to the Internet 5, a display unit 106 that displays an image, an operation unit 107 that accepts input of operation by a participant who is a user, a camera 108 that images the participant, a speaker 109 that outputs voice, a microphone 110 that collects voice of an operator, and an external storage device 111, each of which is connected to a bus 112.

A CD-ROM 111A is attached to the external storage device 111. The CPU 101 controls the external storage device 111 to read data stored in the CD-ROM 111A.

A module in which at least two of the camera 108, the speaker 109, or the microphone 110 are integrated may be connected to the PC 100. The module includes, for example, a headset in which the speaker 109 and the microphone 110 are integrated.

Figure 4:
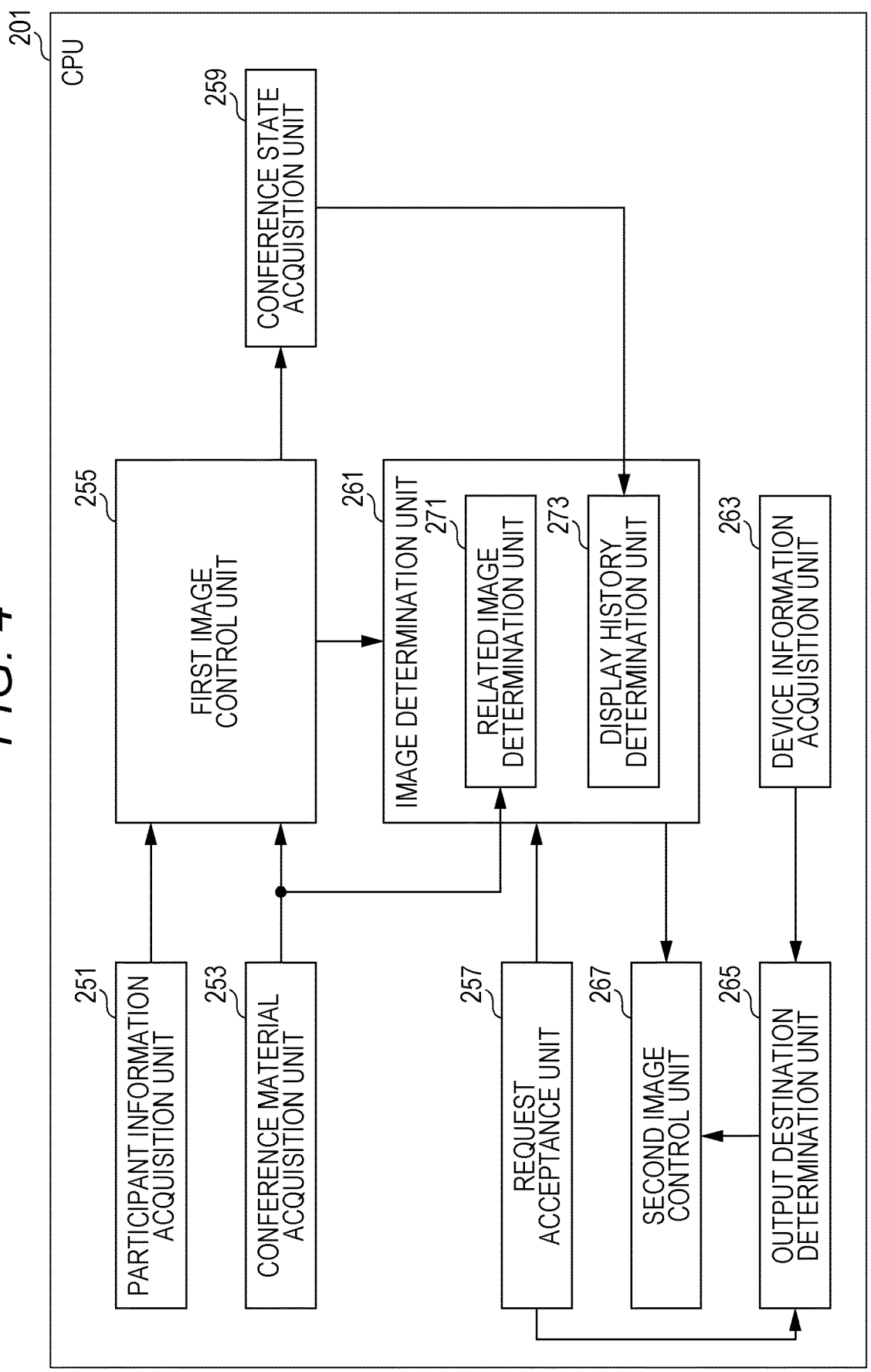
FIG. 4 is a diagram illustrating an example of functions of a CPU included in the server in the present embodiment.

FIG. 4 is a diagram illustrating an example of functions of a CPU included in the server in the present embodiment. The functions illustrated in FIG. 4 are functions implemented by the CPU 201, by execution of an output image control program stored in the ROM 202, HDD 204, or CD-ROM 211 by the CPU 201 included in the server 200. Referring to FIG. 4, the CPU 201 includes a participant information acquisition unit 251, a conference material acquisition unit 253, a first image control unit 255, a request acceptance unit 257, a conference state acquisition unit 259, an image determination unit 261, a device information acquisition unit 263, an output destination determination unit 265, and a second image control unit 267.

The participant information acquisition unit 251 acquires information regarding the participants who participate in the conference. The participants participate in the conference by operating any of the PCs 100-1 to 100-N. In a case where user IDs are input as identification information for identifying the participants when the participants participate in the conference, the user IDs of the participants are acquired from the respective PCs 100-1 to 100-N. In a case where a user ID is received from any of the PCs 100-1 to 100-N, the participant information acquisition unit 251 associates the user ID with device identification information for identifying a device that has transmitted the user ID among the PCs 100-1 to 100-N. Specifically, the participant information acquisition unit 251 generates a participant record including the user ID and the device identification information, and stores a participant table including a plurality of participant records in the HDD 204.

The conference material acquisition unit 253 acquires data of materials to be used in the conference as presentation data. Specifically, in a case where the presentation data is received from a PC operated by a presenter among the PCs 100-1 to 100-N, the conference material acquisition unit 253 stores the presentation data in the HDD 204. The presentation data is application data or image data. Here, the presentation data includes a plurality of pages.

The first image control unit 255 transmits, as a first image, an image of a page selected by the presenter included in the presentation data (hereinafter referred to as "presentation page") to each of the PCs 100-1 to 100-N. As a result, the first image is output by each of the PCs 100-1 to 100-N. Usually, the first image is displayed on display devices included in the respective PCs 100-1 to 100-N. As a result, the first image is shared by all the participants. Specifically, the first image control unit 255 controls the communication unit 205 to transmit the first image to each of the PCs 100-1 to 100-N in response to reception of an instruction to select a presentation page from the PC 100-N operated by the presenter. The first image control unit 255 transmits the first image to each of the PCs 100-1 to 100-N each time an instruction to select a presentation page is received from the PC 100-N operated by the presenter. Thus, in response to switching of presentation pages by the presenter, an image of a presentation page after being switched by the presenter is displayed as the first image in each of the PCs 100-1 to 100-N. Note that the first image control unit 255 may transmit the presentation data to each of the PCs 100-1 to 100-N in advance, and transmit a command to display the first image to each of the PCs 100-1 to 100-N each time an instruction to select a presentation page is received from the PC 100-N operated by the presenter.

The conference state acquisition unit 259 acquires a conference state. The conference state includes presentation page state information and participant state information. The presentation page state information is information indicating a state in which the presentation page is displayed, and includes page identification information for identifying the presentation page and a time during which the presentation page is displayed. The participant state information is information indicating a state in which the participant is speaking, and includes participant identification information for identifying the participant and a time during which the participant is speaking.

The conference state acquisition unit 259 determines, as a display start time, a time when the first image determined as the presentation page by the first image control unit 255 is transmitted, and determines, as a display end time, a time when the first image determined next as the presentation page by the first image control unit 255 is transmitted. Each time the presentation page is switched, the conference state acquisition unit 259 generates a page record in which a display start time at which display of the presentation page is started and a display end time at which display of the presentation page ends are associated with each other. The conference state acquisition unit 259 adds the page record to a presentation page table stored in the HDD 204.

The conference state acquisition unit 259 acquires voice information indicating voice of the participant from each of the PCs 100-1 to 100-N operated by the plurality of participants. Each of the PCs 100-1 to 100-N transmits, to the server 200, voice information obtained by converting a voice collected by the microphone 110 into a digital signal, and video information obtained by converting a video obtained by imaging the face of the participant by the camera 108 into a digital signal. The conference state acquisition unit 259 stores the voice information and the video information received by the communication unit 205 from each of the PCs 100-1 to 100-N in the HDD 204 in association with the participant. The voice information and the video information may be stored in association with the PCs 100-1 to 100-N, or may be stored in association with the participants who operate the PCs 100-1 to 100-N. The participant is authenticated and specified by the server 200 at a stage at which the participant logs in to the remote conference system by operating any of the PCs 100-1 to 100-N.

The conference state acquisition unit 259 specifies participant identification information of the participant on the basis of voice information received from any of the PCs 100-1 to 100-N, calculates a speech start time, a speech end time, and a speech time, and generates a voice record in which the participant identification information, the speech start time, the speech end time, and the speech time are associated with each other. The conference state acquisition unit 259 adds the voice record to a voice table stored in the HDD 204.

The request acceptance unit 257 accepts a request from any of the plurality of participants. The request here includes a request for displaying a second image different from the first image. The request acceptance unit 257 controls the communication unit 205 to accept the request of the participant in a case where a signal indicating the request of the participant is received from any of the PCs 100-1 to 100-N. The request acceptance unit 257 outputs a determination instruction to the image determination unit 261 and the output destination determination unit 265 in response to reception of a signal indicating the request of the participant by the communication unit 205.

The image determination unit 261 determines the second image in response to input of the determination instruction from the request acceptance unit 257. The image determination unit 261 includes a related image determination unit 271 and a display history determination unit 273. The related image determination unit 271 determines the second image from among images related to the first image. The related image determination unit 271 determines an image specified by a reserved word included in the first image as an image related to the first image. The reserved word is an instruction word that is a word indicating image identification information in combination with image identification information for identifying another image, or the image identification information itself. The instruction word is, for example, a verb such as "refer", "indicate", or "represent". The image identification information includes a file name and a page number. In addition, the image identification information includes names such as a figure number, a table number, and a graph number attached to a figure, a table, a graph, and the like. Further, the image identification information may include a network address indicating a location in a network such as a uniform resource locator (URL).

The related image determination unit 271 extracts a reserved word from the first image and determines an image specified by the reserved word as the second image. Specifically, in a case where an instruction word is extracted from the first image, the related image determination unit 271 specifies image identification information indicated by the instruction word, and determines an image of a page specified by the image identification information as the second image. For example, in a case where the first image includes a character string "refer to the second page", the related image determination unit 271 extracts the instruction word "refer" from the first image, and determines "the second page" as image identification information specified by the instruction word. For example, in a case where the first image includes a character string "FIG. 2", the related image determination unit 271 determines "FIG. 2" as image identification information from the first image. Here, a description will be given of a case where the image identification information identifies an image included in presentation data including the first image. In a case where the image identification information identifies an image included in data different from the presentation data, the related image determination unit 271 determines the second image with data stored in a predetermined range as a search target. For example, in a case where there is a plurality of pieces of presentation data, the related image determination unit 271 determines a folder storing the plurality of pieces of presentation data as the search target. In addition, the image identification information may be a network address such as a URL indicating a location on the Internet. The related image determination unit 271 determines an image of a web page specified by the URL as the second image.

The related image determination unit 271 may create an association table at a stage at which presentation data is received. The related image determination unit 271 sequentially selects the presentation data as a processing target from the first page, and extracts a reserved word from the selected page. In a case where a reserved word is extracted, the related image determination unit 271 determines a page specified by the extracted reserved word. Then, the related image determination unit 271 generates an association record in which page identification information of the page as the processing target is associated with the page specified by the reserved word, and adds the association record to the association table stored in the HDD 204.

FIG. 5 is a diagram illustrating an example of a first association table. The first association table is one of association tables, and includes an item of a reference source page and an item of a reference destination page. In the item of the reference source page, page identification information of a page as a processing target by the related image determination unit 271 is set, and in the item of the reference destination page, page identification information of a page specified by the reserved word by the related image determination unit 271 is set. For example, in the first record, the fifth page is set in the item of the reference source page, and the tenth page is set in the item of the reference destination page. This indicates that the tenth page is specified by a reserved word included in the fifth page, and the tenth page is associated with the fifth page.

FIG. 6 is a diagram illustrating an example of a second association table. The second association table is one of the association tables, and includes an item of a reference source page, an item of a reference chart number, and an item of a chart number page. Page identification information of a page as a processing target by the related image determination unit 271 is set, image identification information is set in the item of the reference chart number, and page identification information of a page including an image specified by image identification information is set in the item of the chart number page. For example, in the first record, the second page is set in the item of the reference source page, "FIG. 3" is set in the item of the reference chart number, and the fifth page is set in the item of the chart number page. This indicates that the fifth page including image identification information "FIG. 3" that is a reserved word included in the second page is specified, and the fifth page is associated with the second page.

Referring back to FIG. 4, the display history determination unit 273 determines the second image from among a plurality of images transmitted to the PCs 100-1 to 100-N as the first images in the past by the first image control unit 255. The plurality of images transmitted to the PCs 100-1 to 100-N as the first images in the past by the first image control unit 255 is displayed on each of the PCs 100-1 to 100-N. Each of the plurality of images transmitted to the PCs 100-1 to 100-N as the first images in the past by the first image control unit 255 is referred to as a displayed image. The display history determination unit 273 determines the second image from among a plurality of displayed images on the basis of a displayed time. For example, the display history determination unit 273 determines the displayed image having the longest displayed time as the second image. A time during which the plurality of displayed images is displayed is calculated with reference to the presentation page table stored in the HDD 204.

The display history determination unit 273 determines, as the second image, a displayed image displayed while a predetermined participant speaks from among the plurality of displayed images. For example, the display history determination unit 273 determines, as the second image, a displayed image displayed while a participant A is speaking. A time during which the participant A is speaking is calculated with reference to the voice table stored in the HDD 204.

The display history determination unit 273 may create a speaker table and a display time table while the conference progresses. The display history determination unit 273 generates a speaker record and a display time record each time a presentation page is displayed, and adds the speaker record and the display time record to the speaker table and the display time table stored in the HDD 204, respectively.

FIG. 7 is a diagram illustrating an example of the speaker table. Referring to FIG. 7, the speaker table includes an item of a speaker and an item of a speech page. Page identification information for identifying the presentation page is set in the item of the speech page, and participant identification information of a participant who has spoken while the presentation page is displayed is set in the item of the speaker. For example, in the first record, "SATO" is set in the item of the speaker, and "1" is set in the item of the speech page. This indicates that a participant of the user identification information "SATO" has spoken while the first page is displayed as the presentation page.

FIG. 8 is a diagram illustrating an example of the display time table. Referring to FIG. 8, the display time table includes an item of a presentation page, an item of a start time, an item of an end time, and an item of a display time (seconds). Page identification information of the presentation page is set in the item of the presentation page, a time at which display of the presentation page is started is set in the item of the start time, a time at which display of the presentation page is ended is set in the item of the end time, and a time from the start time to the end time is set in the item of the display time (seconds). For example, in the first record, "1" is set in the item of the presentation page, "10:00:00" is set in the item of the start time, "10:00:20" is set in the item of the end time, and "20" is set in the item of the display time (second). This indicates that the first page has been displayed as the presentation page for 20 seconds from 10:10:00 to 10:10:20.

The request accepted by the request acceptance unit 257 may include related page designation, time designation for displaying an image with a long display time, and speech page designation including user identification information for identifying a predetermined user. In this case, designation by the user can be included in the request accepted by the request acceptance unit 257. The designation by the user includes related page designation for displaying a related image, time designation for displaying an image with a long display time, and speech page designation for designating a predetermined user. The request acceptance unit 257 outputs a determination instruction including designation by the user to the image determination unit 261. For example, in a case where the determination instruction includes related page designation for displaying a related image, the related image determination unit 271 determines the second image. In a case where the determination instruction includes time designation for displaying an image with a long display time, the display history determination unit 273 determines the second image on the basis of the display time. In addition, in a case where the determination instruction includes speech page designation including user identification information for identifying a predetermined user, the display history determination unit 273 determines the second image displayed while the user is speaking.

Figure 9:
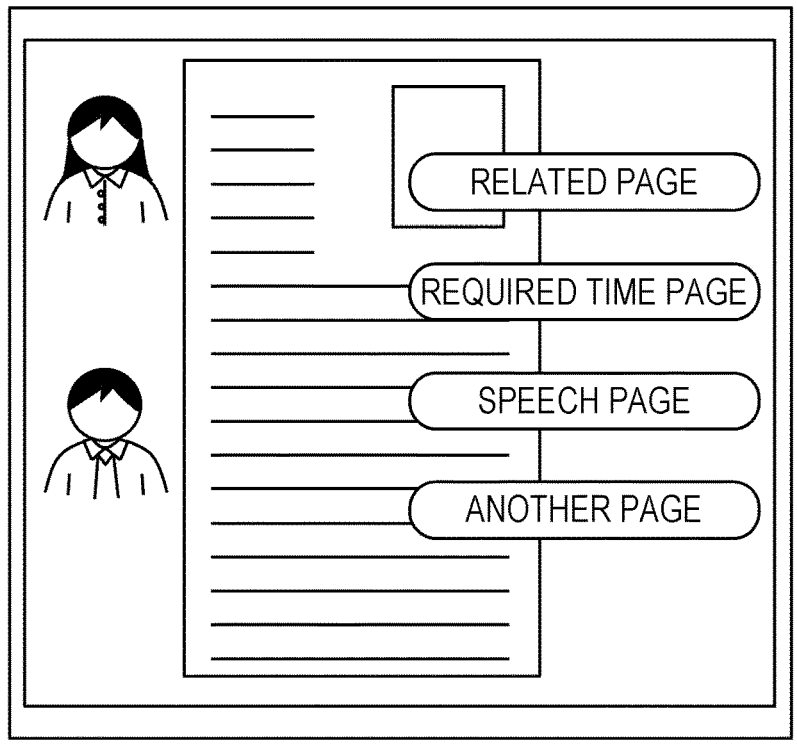
FIG. 9 is a diagram illustrating an example of a request setting screen.

FIG. 9 is a diagram illustrating an example of a request setting screen. The request setting screen is displayed by input of a request instruction to the PCs 100-1 to 100-N operated by the plurality of participants participating in the conference. FIG. 9 illustrates a state in which the request setting screen is displayed to be superimposed on a part of the first image in a state in which the first image is displayed. The request setting screen includes four selection menus. In a case where an option representing characters of "related page" is selected by a participant, a signal indicating a request including related page designation is transmitted to the server 200. In a case where the signal indicating the request including the related page designation is received from any of the PCs 100-1 to 100-N, the request acceptance unit 257 outputs a determination instruction including the related page designation to the image determination unit 261.

In a case where an option representing characters of "required time page" is selected by a participant, a signal indicating a request including time designation is transmitted to the server 200. In a case where the signal indicating the request including the time designation is received from any of the PCs 100-1 to 100-N, the request acceptance unit 257 outputs a determination instruction including the time designation to the image determination unit 261. In this case, a displayed time may be settable in the time designation.

In a case where an option representing characters of "speech page" is selected by a participant, a participant list is displayed, and when any of the participants is selected by the participant, a signal indicating a request including speech page designation is transmitted to the server 200. The participant list includes participant identification information of all the participants of the conference or all the participants who have spoken. The speech page designation includes participant identification information of a speaker selected by the participant. In a case where the signal indicating the request including the speech page designation is received from any of the PCs 100-1 to 100-N, the request acceptance unit 257 outputs a determination instruction including the speech page designation to the image determination unit 261.

In a case where an option representing characters of "another page" is selected by a participant, an area for designating a page is displayed, and when a page is designated by the participant, a signal indicating a request including page identification information of the designated page is transmitted to the server 200. In a case where the signal indicating the request including the page identification information is received from any of the PCs 100-1 to 100-N, the request acceptance unit 257 outputs a determination instruction including the page identification information to the image determination unit 261. The image determination unit 261 determines an image of a page specified by the page identification information as the second image.

Figure 10:
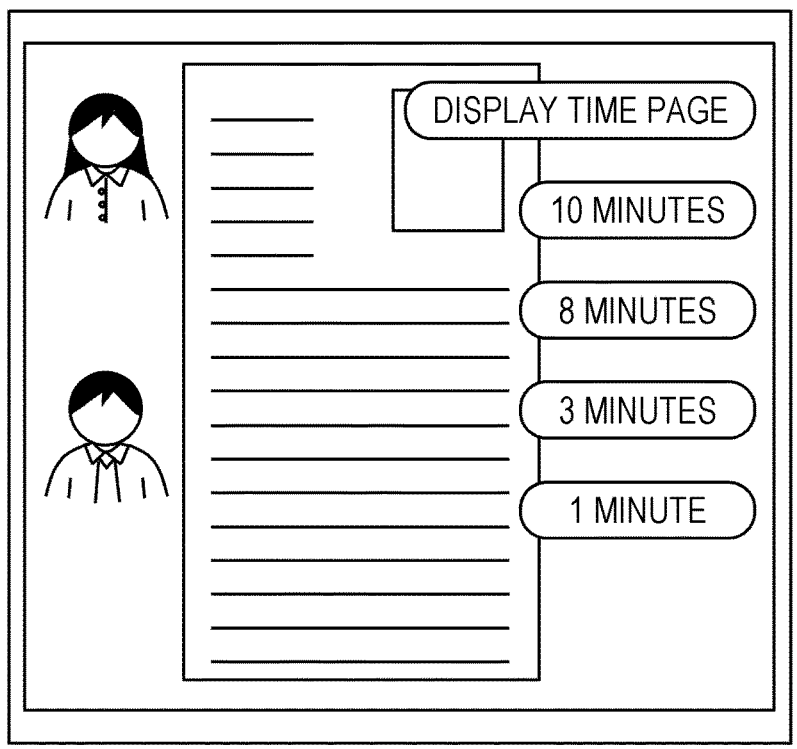
FIG. 10 is a diagram illustrating an example of a display time setting screen.

FIG. 10 is a diagram illustrating an example of a display time setting screen. Referring to FIG. 10, the display time setting screen includes a plurality of display times, here, selection menus for 10 minutes, 8 minutes, 3 minutes, and 1 minute. In a case where an option for 10 minutes is selected, a page with a displayed time of greater than or equal to 10 minutes is determined as the second image; in a case where an option for 8 minutes is selected, a page with a displayed time of greater than or equal to 8 minutes and less than 10 minutes is determined as the second image; in a case where an option for 3 minutes is selected, a page with a displayed time of greater than or equal to 3 minutes and less than 8 minutes is determined as the second image; and in a case where an option for 1 minute is selected, a page with a displayed time of greater than or equal to 1 minute is determined as the second image.

Figure 11:
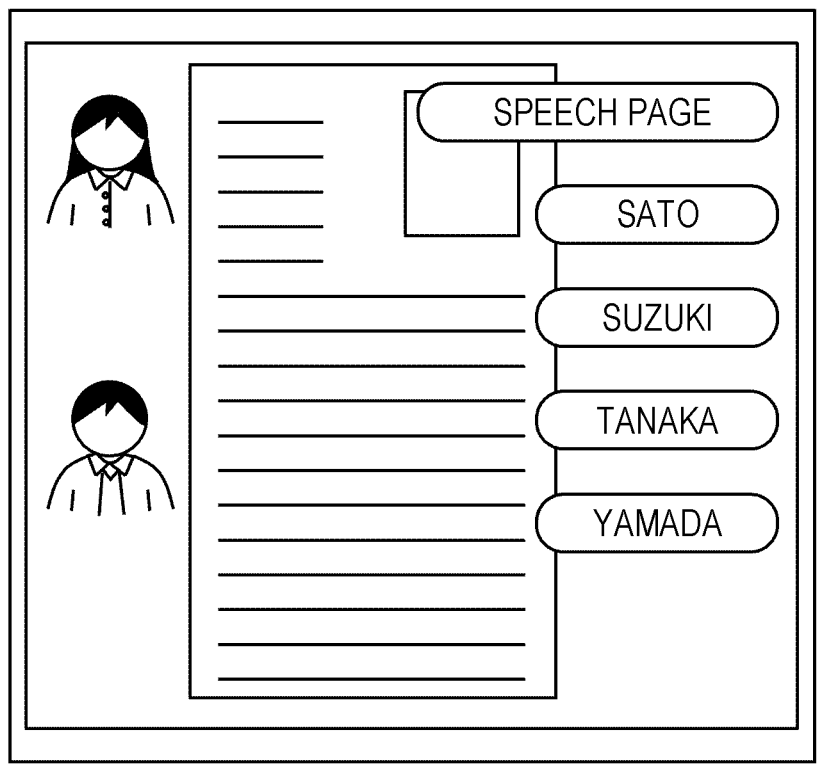
FIG. 11 is a diagram illustrating an example of a participant selection screen.

FIG. 11 is a diagram illustrating an example of a participant selection screen. Referring to FIG. 11, the participant selection screen includes participant identification information "SATO", "SUZUKI", "TANAKA", and "YAMADA" displayed in a selectable state.

Referring back to FIG. 4, the device information acquisition unit 263 acquires device information of each of the PCs 100-1 to 100-N. The device information includes the number of display devices and whether or not an image forming apparatus is connected. Here, the PC 100-1 is connected to two display devices, and the other PCs 100-2 to 100-N are connected to one display device. In addition, the PCs 100-2 and 100-3 are connected to the MFPs 300-2 and 300-3, respectively, and the other PCs 100-1, and 100-4 to 100-N are not connected to the image forming apparatus.

The output destination determination unit 265 determines an output destination of the second image from among the PCs 100-1 to 100-N. The output destination determination unit 265 determines, as the output destination, a requesting device that has transmitted the request accepted by the request acceptance unit 257. Here, a case where the PC 100-1 serves as the requesting device will be described as an example. Further, the output destination determination unit 265 determines the output destination on the basis of the device information of the requesting device. The device information of the PC 100-1, which is the requesting device, acquired by the device information acquisition unit 263 indicates that two display devices are included. In this case, the output destination determination unit 265 determines, as the output destination, a second display device different from a first display device on which the first image is displayed among the two display devices. Note that, in a case where any of the PCs 100-2 and 100-3, for example, the PC 100-2 is determined as the output destination, the device information of the PC 100-2 indicates that the MFP 300-2 is connected. In this case, the output destination determination unit 265 determines the MFP 300-2 as the output destination.

The second image control unit 267 outputs the second image determined by the image determination unit 261 to the output destination determined by the output destination determination unit 265. Specifically, the second image control unit 267 transmits the second image to the requesting device and causes the second image to be output from the output destination. For example, the second image control unit 267 controls the communication unit 205 to output an output instruction to the requesting device. The output instruction includes the second image and an output method for the second image. In a case where the second image control unit 267 outputs the output instruction to the PC 100-1, the output method is a command to cause the second display device to perform display. In a case where the second image control unit 267 outputs the output instruction to any of the PCs 100-2 and 100-3, the output method is a command to cause the MFPs 300-2 and 300-3 to perform image formation.

Figure 12:
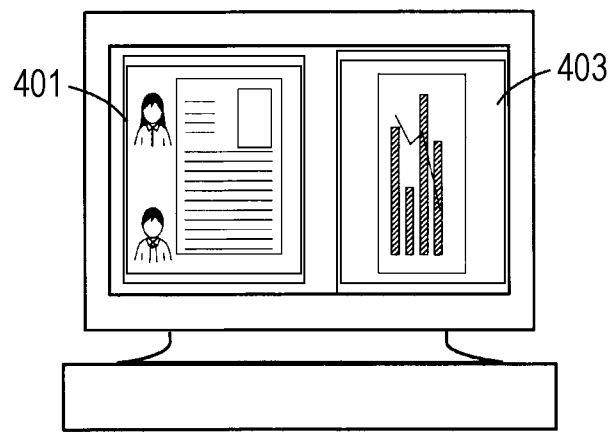
FIG. 12 is a first diagram illustrating an example of a display state.

FIG. 12 is a first diagram illustrating an example of a display state. FIG. 12 illustrates a display state of each of the PCs 100-4 to 100-N. Each of the PCs 100-4 to 100-N includes one display device. For this reason, a window including a first image 401 and a window including a second image 403 are displayed side by side on one display device.

Figure 13:
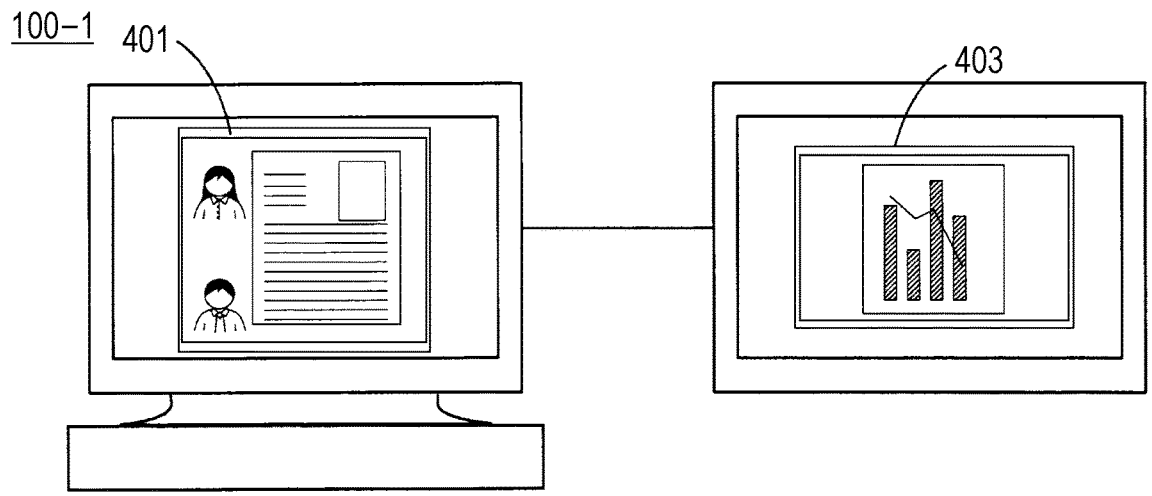
FIG. 13 is a second diagram illustrating an example of the display state.

FIG. 13 is a second diagram illustrating an example of the display state. FIG. 13 illustrates a display state of PC 100-1. The PC 100-1 includes two display devices. For this reason, the window including the first image 401 is displayed on one display device, and the window including the second image 403 is displayed on a display device different from the one display device on which the first image 401 is displayed.

Figure 14:
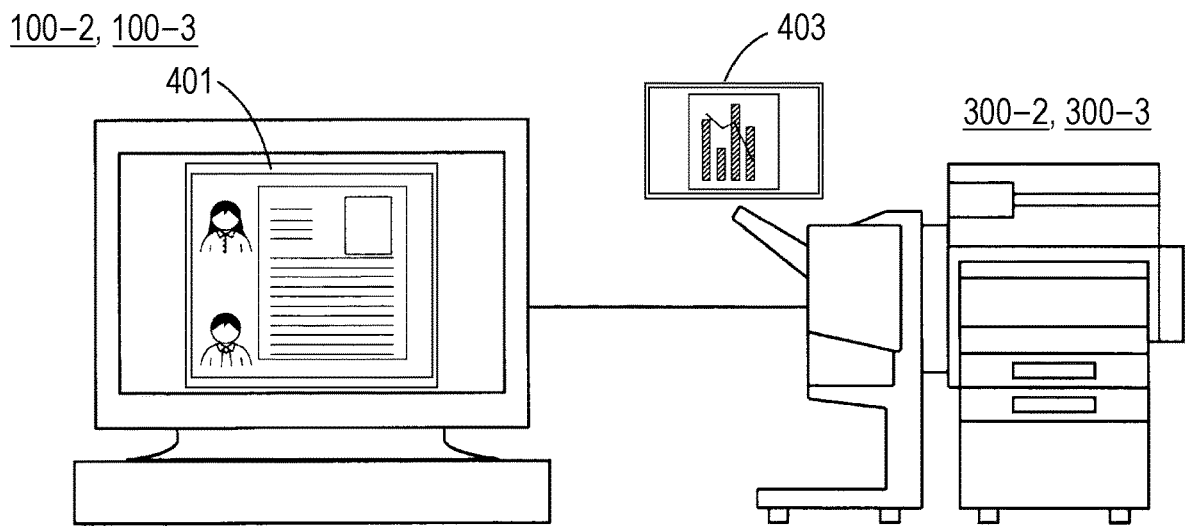
FIG. 14 is a diagram illustrating an example of an output state.

FIG. 14 is a diagram illustrating an example of an output state. FIG. 14 illustrates an output state of each of the PCs 100-2 and 100-3. The PC 100-2 includes one display device and the MFP 300-2, and the PC 100-3 includes one display device and the MFP 300-3. For this reason, the window including the first image 401 is displayed on one display device, the second image 403 is output to each of the MFPs 300-2 and 300-3, and an image of the second image is formed on a recording medium.

Figure 15:
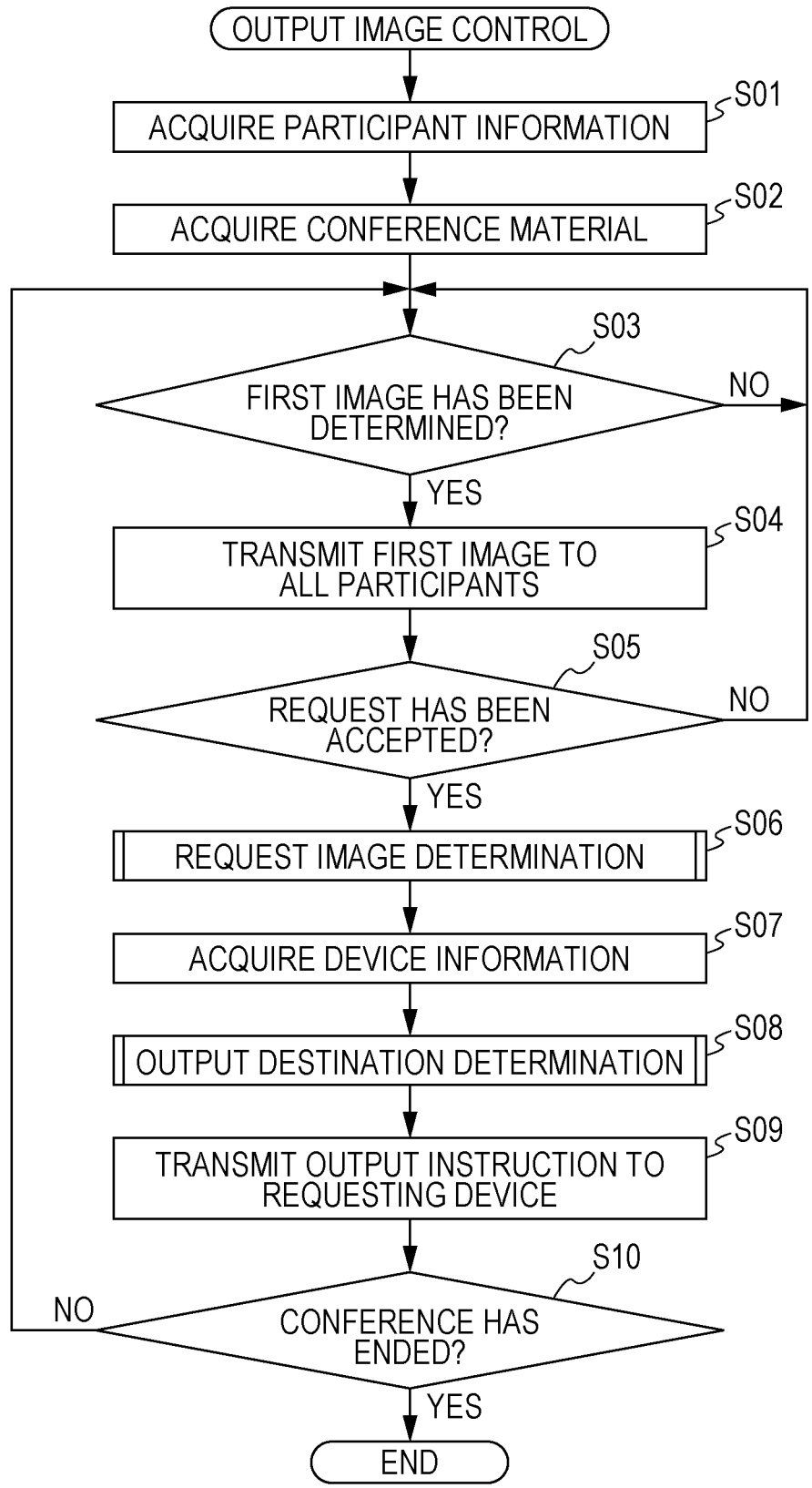
FIG. 15 is a flowchart illustrating an example of a flow of output image control processing.

FIG. 15 is a flowchart illustrating an example of a flow of output image control processing. The output image control processing is processing executed by the CPU 201, by execution of an output image control program stored in the ROM 202, HDD 204, or CD-ROM 211 by the CPU 201 included in the server 200. Referring to FIG. 15, the CPU 201 included in the server 200 acquires participant information (step S01), and advances the processing to step S02. The CPU 201 acquires information regarding the participants participating in the conference. In a case where the communication unit 205 receives a user ID transmitted from any of the PCs 100-1 to 100-N, a participant record is generated that includes the user ID and device identification information of a device that has transmitted the user ID among the PCs 100-1 to 100-N, and added to the participant table stored in the HDD 204.

In step S02, the conference material is acquired, and the processing proceeds to step S03. In a case where the communication unit 205 receives presentation data from any of the PCs 100-1 to 100-N, the presentation data is acquired. In a case where a presenter is determined among the plurality of participants and the presenter inputs an instruction to transmit presentation data to a PC operated among the PCs 100-1 to 100-N, the presentation data is transmitted from the PC. The presentation data received by the communication unit 205 is stored in the HDD 204. Here, a case where presentation data includes a plurality of pages will be described as an example.

In step S03, it is determined whether or not the first image has been determined. If the first image has been determined, the processing proceeds to step S04, otherwise the processing returns to step S03. In a case where a presentation page included in the presentation data is selected by the presenter, the image of the presentation page is determined as the first image. In step S04, the first image is transmitted to all the participants, and the processing proceeds to step S05. At this stage, the first image is displayed on each of the PCs 100-1 to 100-N.

In step S05, it is determined whether or not a request has been accepted. In a case where the communication unit 205 receives a request from any of the PCs 100-1 to 100-N, it is determined that the request has been accepted. The request here includes displaying the second image different from the first image. In a case where the communication unit 205 receives a signal indicating a request of a participant from any of the PCs 100-1 to 100-N, the request is accepted. If the request has been accepted, the processing proceeds to step S06, otherwise the processing returns to step S03.

In step S06, request image determination processing is executed, and the processing proceeds to step S07. Although details of the request image determination processing will be described later, the request image determination processing is processing of determining the second image for which output is requested by any of the participants. When the request image determination processing is executed, the second image is determined.

In step S07, device information is acquired, and the processing proceeds to step S08. From a requesting device that has transmitted the signal indicating the request of the participant among the PCs 100-1 to 100-N, device information of the device is acquired. When the communication unit 205 is controlled to request the requesting device to transmit the device information and the communication unit 205 receives the device information from the requesting device, the device information is acquired.

In step S08, output destination determination processing is executed, and the processing proceeds to step S09. Although details of the output destination determination processing will be described later, the output destination determination processing is processing of determining a method by which the second image is output.

In step S09, an output instruction is transmitted to the requesting device, and the processing proceeds to step S10. The output instruction is transmitted from the communication unit 205 to the requesting device. The output instruction includes the second image and a command indicating a method of outputting the second image. In step S10, it is determined whether or not the conference has ended. If the conference has ended, the processing ends, otherwise the processing returns to step S03.

Figure 16:
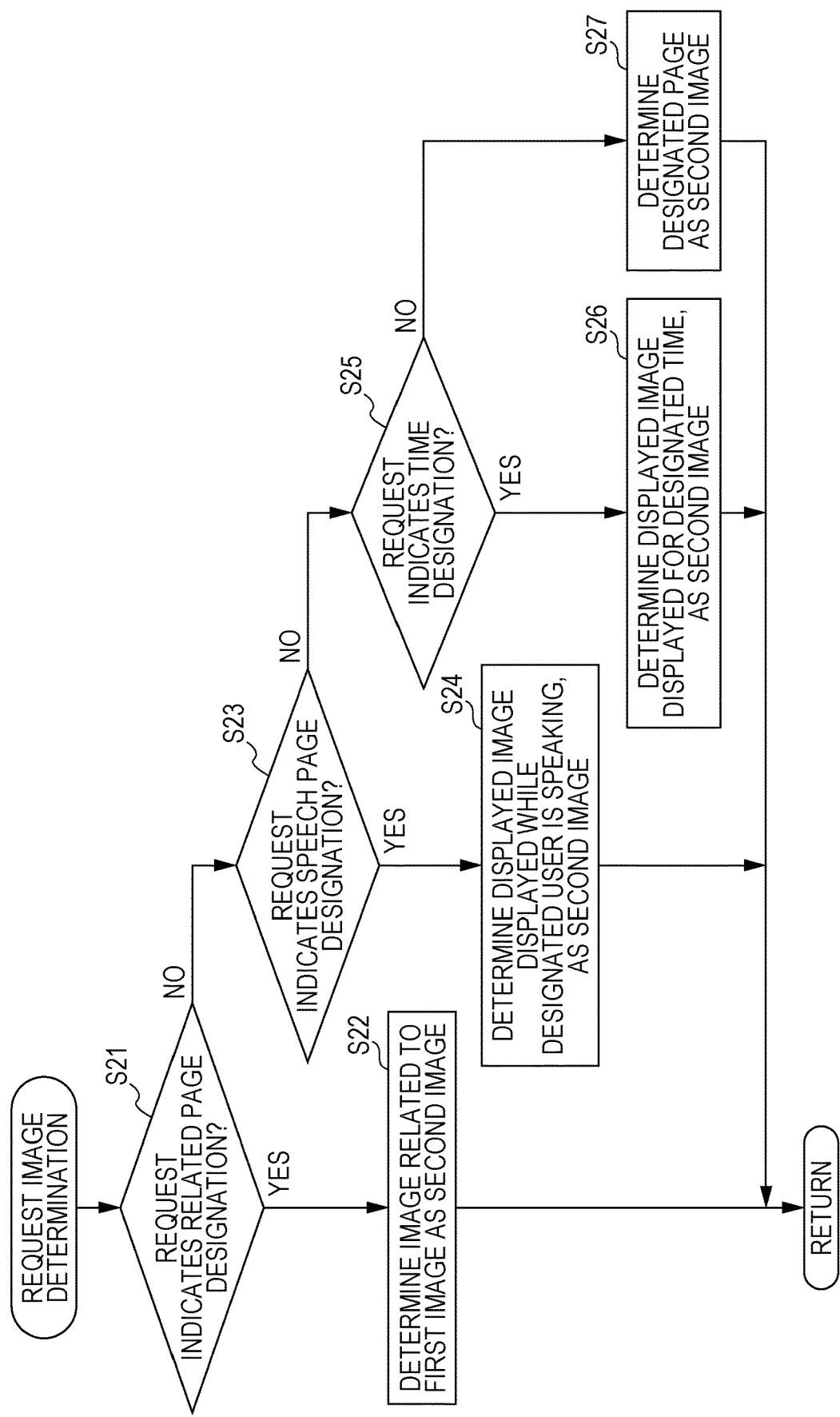
FIG. 16 is a flowchart illustrating an example of a flow of request image determination processing.

FIG. 16 is a flowchart illustrating an example of a flow of the request image determination processing. The request image determination processing is processing executed in step S06 of the output image control processing. Referring to FIG. 16, it is determined whether or not the request indicates related page designation (step S21). If the request indicates the related page designation, the processing proceeds to step S22, otherwise the processing proceeds to step S23.

In step S22, an image related to the first image is determined as the second image, and the processing returns to the output image control processing. An image specified by a reserved word included in the first image is determined as an image related to the first image. The reserved word is an instruction word or image identification information itself. The instruction word is, for example, a verb such as "refer", "indicate", or "represent". The image identification information includes a file name and a page number. In addition, the image identification information includes names such as a figure number, a table number, and a graph number attached to a figure, a table, a graph, and the like, and a network address indicating a location in a network. Specifically, the reserved word is extracted from the first image, and the image specified by the reserved word is determined as the second image.

In step S23, it is determined whether or not the request indicates speech page designation. If the request indicates the speech page designation, the processing proceeds to step S24, otherwise the processing proceeds to step S25. In step S24, a displayed image displayed while a designated user is speaking is determined as the second image, and the processing returns to the output image control processing. The displayed image is an image transmitted to and displayed on the PCs 100-1 to 100-N as the first image. The designated user is a participant identified by user identification information included in the speech page designation indicated in the request. With reference to the voice table stored in the HDD 204, a time during which the designated user is speaking is specified, and with reference to the presentation page table stored in the HDD 204, a time during which a presented image is displayed is specified. Then, the displayed image displayed while the designated user is speaking is specified.

In step S25, it is determined whether or not the request indicates time designation. If the request indicates the time designation, the processing proceeds to step S26, otherwise the processing proceeds to step S27. In step S26, a displayed image displayed for a designated time is determined as the second image, and the processing returns to the output image control processing. With reference to the presentation page table stored in the HDD 204, a time during which the presented image is displayed is specified.

In step S27, a designated page is determined as the second image, and the processing returns to the output image control processing. An image of the designated page specified by the page identification information included in the request among the plurality of pages included in the presentation data is determined as the second image.

Figure 17:
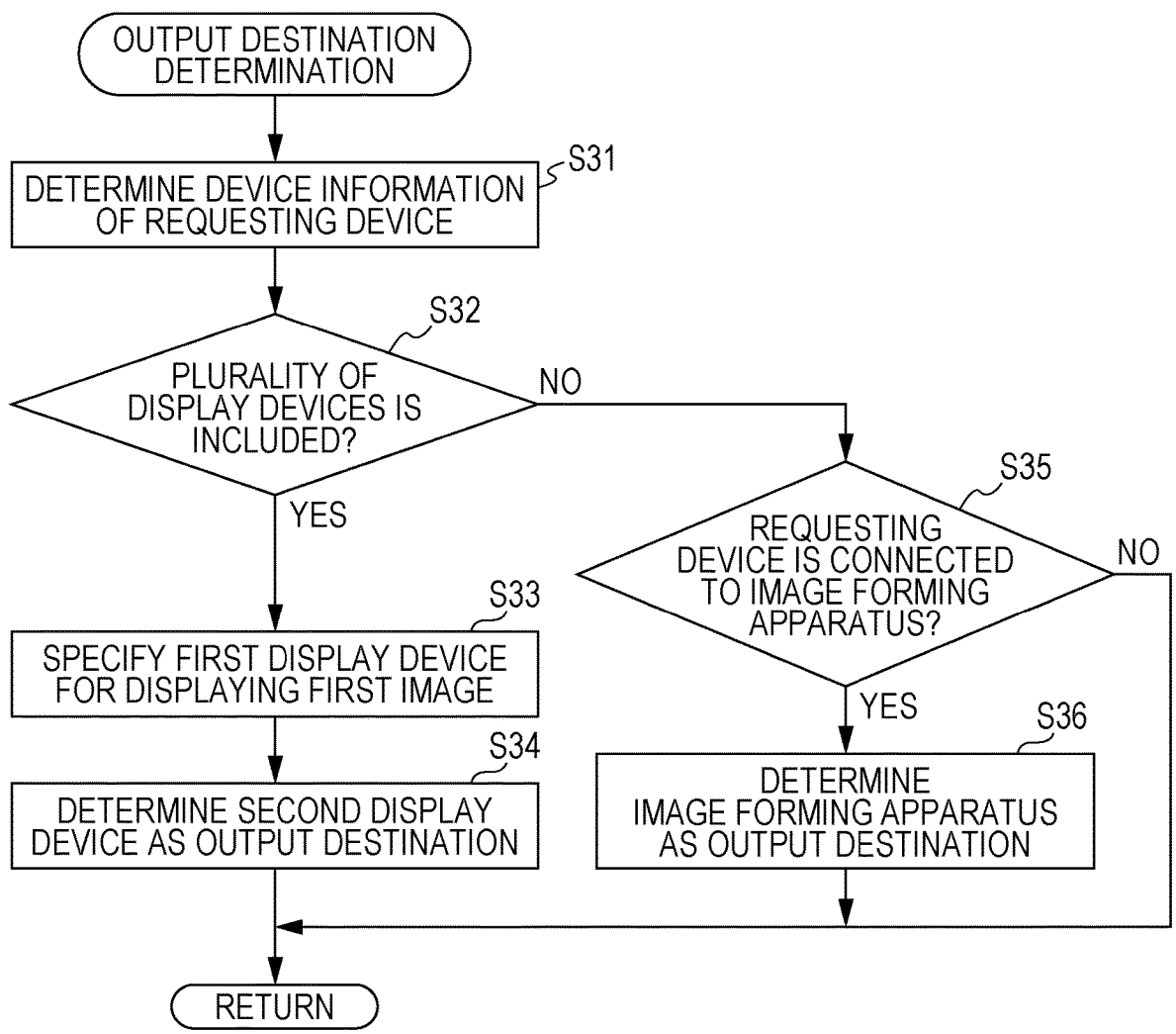
FIG. 17 is a flowchart illustrating an example of a flow of output destination determination processing.

FIG. 17 is a flowchart illustrating an example of a flow of the output destination determination processing. The output destination determination processing is processing executed in step S08 of the output image control processing. Referring to FIG. 17, the device information of the requesting device is determined (step S31), and the processing proceeds to step S32. The device information of each of the PCs 100-1 to 100-N is acquired in step S07 of the output image control processing. The device information of the requesting device among the PCs 100-1 to 100-N is determined.

In step S32, it is determined whether or not the requesting device includes a plurality of display devices. If the requesting device includes the plurality of display devices, the processing proceeds to step S33, otherwise the processing proceeds to step S35. In step S33, the first display device on which the first image is displayed is specified, and the processing proceeds to step S34. The first display device is specified by an inquiry to the requesting device about the display device on which the first image is displayed. In step S34, the second display device is determined as the output destination, and the processing returns to the output image control processing. The second display device is a display device different from the first display device among the plurality of display devices included in the requesting device.

In step S35, it is determined whether or not the requesting device is connected to the image forming apparatus. If the requesting device is connected to the image forming apparatus, the processing proceeds to step S36, otherwise the processing returns to the output image control processing. In step S36, the image forming apparatus is determined as the output destination, and the processing returns to the output image control processing.

Note that, although the first display device is specified in step S33 and the second display device is determined as the output destination in step S34, a display device on which the first image is not displayed may be determined as the output destination. In this case, the requesting device is determined as the output destination, and a command indicating that the display device on which the first image is not displayed is the output destination is set to be transmitted to the requesting device.

<First Modification>

In the remote conference system 1 in the above-described embodiment, the CPU 201 included in the server 200 includes the image determination unit 261 and the output destination determination unit 265. In the remote conference system 1 in a first modification, the CPU 201 included in the server 200 includes any one of the image determination unit 261 or the output destination determination unit 265.

In a case where the CPU 201 included in the server 200 includes the image determination unit 261 but does not include the output destination determination unit 265, further, the device information acquisition unit 263 is not included. In this case, the server 200 transmits the second image determined by the image determination unit 261 to the requesting device.

In a case where the CPU 201 included in the server 200 includes the output destination determination unit 265, the image determination unit 261 is not included. In this case, the server 200 transmits, to the requesting device, the second image designated by the participant who operates the requesting device.

As described above, the remote conference system 1 in the present embodiment remotely implements the conference by using the PCs 100-1 to 100-N respectively operated by the plurality of participants. The server 200 outputs the first image so that the first image shared by the plurality of participants is displayed on each of the PCs 100-1 to 100-N, determines the output destination on the basis of the state of the requesting device operated by the requester among the PCs 100-1 to 100-N, and outputs the second image so that the second image different from the first image is output from the output destination determined in a state in which the first image is displayed on the requesting device. For this reason, the first image shared by the plurality of participants is displayed on each of the PCs 100-1 to 100-N, and the second image is output in the state in which the first image is displayed on the requesting device operated by the requester. For this reason, the first image and the second image are output to the requesting device. In addition, since the second image is output from the output destination determined on the basis of the state of the requesting device, the requester can view the first image and the second image.

In addition, in the remote conference system 1, for example, in a case where the PC 100-1 is the requesting device, the server 200 determines, as the output destination, the second display device different from the first display device on which the first image is displayed. For this reason, the participant who operates the PC 100-1 can simultaneously view the first image displayed on the first display device and the second image displayed on the second display device.

In the remote conference system 1, for example, in a case where the PC 100-2 is the requesting device, the server 200 determines the MFP 300-2 connected to the PC 100-2 as the output destination. For this reason, the participant who operates the PC 100-2 can simultaneously view the first image displayed on the display device and the second image formed on a sheet.

In addition, in the remote conference system 1 in the present embodiment, the server 200 outputs the first image so that the first image shared by the plurality of participants is displayed on each of the PCs 100-1 to 100-N, determines the second image on the basis of the state of the conference, and outputs the second image so that the second image is output by the requesting device in the state in which the first image is displayed on the requesting device operated by the requester among the PCs 100-1 to 100-N. For this reason, the first image and the second image determined on the basis of the state of the conference are output to the requesting device. Thus, convenience of the participants of the conference is improved.

In addition, the server 200 determines the second image from among the images related to the first image. For this reason, it is possible to output the second image necessary for understanding the content of the first image.

In addition, the server 200 determines the image specified by the reserved word included in the first image as the second image. For this reason, it becomes easy to specify the first image from the second image.

In addition, the server 200 determines the second image from among a plurality of images displayed as the first image in the past. For this reason, it becomes possible to view the first image currently shared and the image displayed in the past, so that the two images can be compared with each other.

In addition, the server 200 determines the second image from among the plurality of images displayed as the first images on the basis of the time during which the images have been displayed as the first images. For this reason, since the second image is determined from the displayed time, it becomes easy to narrow down the second image from the plurality of images. In addition, it becomes possible to view the first image currently shared and the image displayed in the past, so that the two images can be compared with each other.

In addition, the server 200 determines, as the second image, the image displayed as the first image while the predetermined participant speaks among the plurality of images displayed as the first image in the past. For this reason, since the second image is determined from a situation in which the participant has spoken, the second image can be easily determined from the plurality of images. In addition, the participant can view the first image and the image related to the predetermined participant.

In addition, the server 200 determines the output destination on the basis of the state of the requesting device, and outputs the second image so that the second image is output from the determined output destination. Since the second image is output from the output destination determined on the basis of the state of the requesting device, the second image can be easily determined. In addition, the participant can view the first image and the image related to the predetermined participant.

Although embodiments of the present invention have been described and illustrated in detail, the disclosed embodiments are made for purposes of illustration and example only in all respects and not limitation. The scope of the present invention should be interpreted by terms of the appended claims, and it is intended that meanings equivalent to the claims and all modifications within the scope are included.

What is claimed is:

1. A remote conference system that remotely implements a conference using a plurality of operating devices respectively operated by a plurality of participants, the remote conference system comprising a hardware processor that is configured to:
   output a first image shared by the plurality of participants to cause the first image to be displayed on each of the plurality of operating devices;

accept a request for a second image different from the first image from one of the plurality of operating devices that is operated by a requestor that is one of the plurality of participants;

acquire device information about the one of the plurality of operating devices;

determine an output destination for one of the plurality of operating devices that is operated by the requester based on the acquired device information and how the first image is displayed by the one of the plurality of operating devices that is operated by the requester; and output the second image to the output destination determined by the hardware processor.

2. The remote conference system according to claim 1, wherein in a case where the one of the plurality of operating devices includes a plurality of display devices, the hardware processor determines, as the output destination, a second display device different from a first display device on which the first image is displayed among the plurality of display devices.

3. The remote conference system according to claim 1, wherein in a case where the one of the plurality of operating devices is connected to an image forming apparatus, the hardware processor determines the image forming apparatus as the output destination.

4. A remote conference system that remotely implements a conference using a plurality of operating devices respectively operated by a plurality of participants, the remote conference system comprising a hardware processor that is configured to:

output a first image shared by the plurality of participants to cause the first image to be displayed on each of the plurality of operating devices;

determine a second image based on events that occurred at the conference;

acquire device information about one of the plurality of operating devices that is operated by a requestor that is one of the plurality of participants; and output the second image to cause the second image to be output by the requesting device operated by the requester among the plurality of operating devices in a state in which the first image is displayed on the requesting device and based on the acquired device information.

5. The remote conference system according to claim 4, wherein the hardware processor determines the second image from among images related to the first image.

6. The remote conference system according to claim 5, wherein the hardware processor determines an image specified by a reserved word included in the first image as the second image.

7. The remote conference system according to claim 4, wherein the hardware processor determines the second image from among a plurality of images displayed as the first image in a past.

8. The remote conference system according to claim 7, wherein the hardware processor determines the second image on a basis of a time during which each of the plurality of images is displayed as the first image in the past.

9. The remote conference system according to claim 8, wherein the hardware processor determines, as the second image, an image displayed as the first image while a predetermined participant speaks among the plurality of images displayed as the first image in the past.

10. The remote conference system according to claim 4, wherein the hardware processor determines an output destination based on a state of the requesting device, and the hardware processor outputs the second image to cause the second image to be output from the output destination determined by the hardware processor.

11. The remote conference system according to claim 10, wherein in a case where the requesting device includes a plurality of display devices, the hardware processor determines, as the output destination, a second display device different from a first display device on which the first image is displayed among the plurality of display devices.

12. The remote conference system according to claim 10, wherein in a case where the requesting device is connected to an image forming apparatus, the hardware processor determines the image forming apparatus as the output destination.

13. An output image control method executed in a remote conference system that remotely implements a conference using a plurality of operating devices respectively operated by a plurality of participants, the output image control method comprising:

outputting a first image shared by the plurality of participants to cause the first image to be displayed on each of the plurality of operating devices;

accepting a request for a second image different from the first image from one of the plurality of operating devices that is operated by a requestor that is one of the plurality of participants;

acquiring device information about the one of the plurality of operating devices;

determining an output destination for one of the plurality of operating devices that is operated by the requester based on the acquired device information and how the first image is displayed by the one of the plurality of operating devices that is operated by the requester; and outputting the second image to the output destination determined by the hardware processor.

14. An output image control method executed in a remote conference system that remotely implements a conference using a plurality of operating devices respectively operated by a plurality of participants, the output image control method comprising:

outputting a first image shared by the plurality of participants to cause the first image to be displayed on each of the plurality of operating devices;

determining a second image based on events that occurred at the conference;

acquiring device information about one of the plurality of operating devices that is operated by a requestor that is one of the plurality of participants; and outputting the second image to cause the second image to be output by the requesting device operated by the requester among the plurality of operating devices in a state in which the first image is displayed on the requesting device and based on the acquired device information.

15. A non-transitory recording medium storing an output image control program executed by a computer that controls a remote conference system that remotely implements a conference using a plurality of operating devices respectively operated by a plurality of participants, the output image control program causing the computer to execute:

outputting a first image shared by the plurality of participants to cause the first image to be displayed on each of the plurality of operating devices;

accepting a request for a second image different from the first image from one of the plurality of operating devices that is operated by a requestor that is one of the plurality of participants;
- acquiring device information about the one of the plurality of operating devices;
- determining an output destination for one of the plurality of operating devices that is operated by the requester based on the acquired device information and how the first image is displayed by the one of the plurality of operating devices that is operated by the requester; and
- outputting the second image to the output destination determined by the hardware processor.

16. A non-transitory recording medium storing an output image control program executed by a computer that controls a remote conference system that remotely implements a conference using a plurality of operating devices respectively operated by a plurality of participants, the output image control program causing the computer to execute:
- outputting a first image shared by the plurality of participants to cause the first image to be displayed on each of the plurality of operating devices;
- determining a second image based on events that occurred at the conference;
- acquiring device information about one of the plurality of operating devices that is operated by a requestor that is one of the plurality of participants; and
- outputting the second image to cause the second image to be output by the requesting device operated by the requester among the plurality of operating devices in a state in which the first image is displayed on the requesting device and based on the acquired device information.

* * * * *